Figure 1:
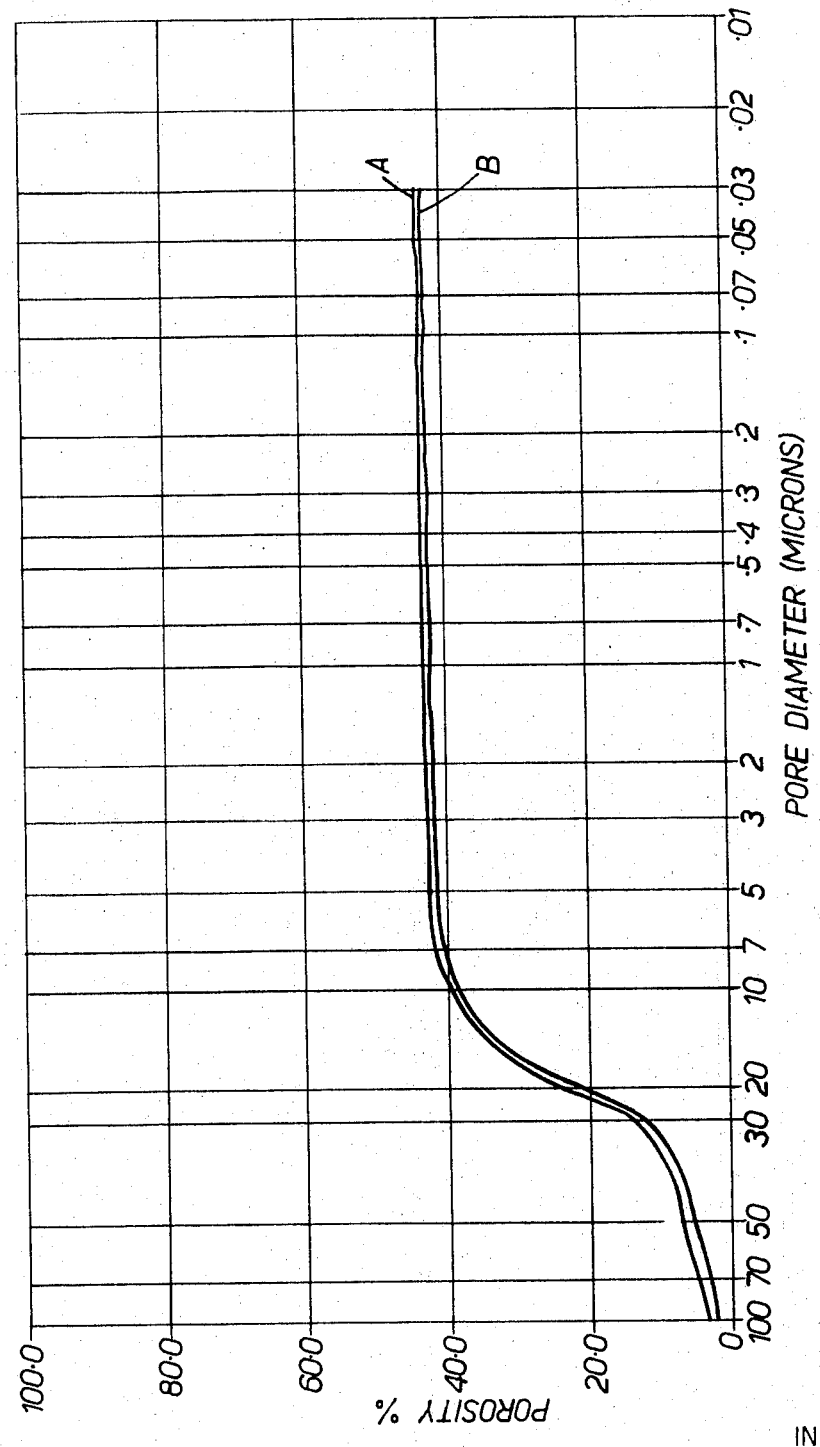

United States Patent
Gillibrand et al.

[11] 3,862,862
[45] Jan. 28, 1975

[54] PROCESS OF MAKING SHEATHED BATTERY ELECTRODES

[75] Inventors: Maurice Ivan Gillibrand, Manchester; Gordon Brown, Kearsley near Bolton, both of England

[73] Assignee: Electric Power Storage Limited, Swinton, Manchester, England

[22] Filed: May 16, 1973

[21] Appl. No.: 360,675

Related U.S. Application Data
[62] Division of Ser. No. 107,284, Jan. 18, 1971, abandoned.

[30] Foreign Application Priority Data
Jan. 20, 1970   Great Britain ..................... 2643/70
Oct. 7, 1970    Great Britain ..................... 47703/70

[52] U.S. Cl. ............................... 136/148, 136/147
[51] Int. Cl. ............................................. H01m 3/04
[58] Field of Search ...................... 136/63, 147, 148

[56] References Cited
UNITED STATES PATENTS
| | | | |
|---|---|---|---|
| 2,673,230 | 3/1954 | Brennan............................. | 136/147 |
| 2,759,039 | 8/1956 | Clark .................................. | 136/147 |
| 2,934,585 | 4/1960 | Zahn.................................. | 136/147 |

FOREIGN PATENTS OR APPLICATIONS
| | | | |
|---|---|---|---|
| 416,981 | 9/1934 | Great Britain ..................... | 136/147 |
| 923,337 | 4/1963 | Great Britain ..................... | 136/147 |

OTHER PUBLICATIONS
SPI, Plastics Engineering Handbook, p. 420, Reinhold Pub. Corp., 1954.

*Primary Examiner*—Donald L. Walton
*Attorney, Agent, or Firm*—Watson, Cole, Grindle & Watson

[57] ABSTRACT

The invention relates to novel electric storage battery assemblies novel separator envelopes and novel unitary sheathed electrodes incorporating the separator envelopes for use in the battery envelopes, and to novel processes for making the envelopes and sheathed electrodes. It is particularly applicable to lead acid batteries. The separator is provided by a seam free, preferably sintered, porous polymer envelope enclosing the electrode, the envelope being closed at the bottom edge of the electrode and provided with venting means adjacent the top edge of the electrode for gas escape therefrom and preferably having internal gas passages communicating with the venting means.

The novel process for making the seam free separator envelope for a battery electrode comprise the steps of providing former means for example the electrode with removable masking means such as prongs arranged on each face having an external surface corresponding to the desired internal surface of the envelope, heated to elevated temperature, contacting the said heated former means with discrete dry polymer particles whereby a cohesive porous coating of the polymer of the desired thickness is formed over the former means and then reheating the coated former means to sinter the coating to a tough porous sheath.

11 Claims, 7 Drawing Figures

FIG. I.

PATENTED JAN 28 1975

3,862,862

SHEET 4 OF 4

INVENTORS
MAURICE IVAN GILLIBRAND
GORDON BROWN.

BY
Watson, Cole, Grindle & Watson
ATTORNEY

PROCESS OF MAKING SHEATHED BATTERY ELECTRODES

This is a division of application Ser. No. 107,284, filed Jan. 18, 1971, now abandoned.

The present invention relates to electric batteries and to novel separator electrode assemblies for use therein, and to novel methods of making such structures and assemblies and batteries incorporating such structures and assemblies.

It is concerned particularly but not exclusively with lead acid batteries, but it could also be applicable to other battery systems such as those employing alkaline electrolytes.

The negative and positive plates of lead acid storage batteries are conventionally made by forming an electrically conducting metal structure, for example, a lead alloy plate defining a grid or lattice and adhering thereto a paste of active electrode material.

The pasted plates are then formed or dry charged and assembled with interleaved microporous separators, placed in a container, the plate lugs connected to the respective battery terminals, the container sealed and the electrolyte added.

During the cycles of charge and discharge during use the components of the plates are liable to become loosened; for example, the adherence between particles of the paste and the paste and the grid may be lost. In a conventional battery this results in two main problems. Active material may fall to the bottom of the container reducing the capacity and life of the battery. It may also result in sudden failure due to electrical short circuit through debris in the bottom of the battery bridging across adjacent plates. In addition, in conventional batteries the growth from the electrodes during cell life is liable to bridge round the edges of the separator again resulting in cell failure due to short circuit.

It is also necessary for the dielectric separator structure to provide both for good access of electrolyte to the active material and for venting from the structure of gases generated during certain parts of the operating cycle particularly during charging. The need for venting of the gases arises especially with the positive electrode.

Conventional separators are thus provided with ribbing which may be vertical, or non vertical the ribs facing the positive electrode being of the order of 0.6 to 1 mm high, e.g., 0.8 mm, and spaced about 1 cm apart; and those facing the negative electrode being finer, for example of the order of 0.1 or 0.2 mm high, and closer together.

According to one aspect of the present invention a seam free electrolyte permeable separator envelope for a battery electrode, preferably of porous sintered polymer, e.g., polyvinyl chloride, is closed at the edge adapted to be at the bottom edge of the electrode while being provided with means for spacing it at least 0.1 mm and desirably 0.3, 0.5 or 1 mm or more, away from the surface of at least 40 percent and desirably at least 50 percent, 70 percent, 80 percent 90 percent or more of the pasted area of the electrode so as to provide adequate means for electrolyte access to the electrode. The envelope has at least one opening at or adjacent the top edge of the electrode extending along at least 40 percent of the width of the electrode so as to provide adequate means for gas venting from the electrode. In a preferred form of the invention the envelope encloses the electrode forming a unitary structure.

Thus, according to another form of the invention, a unitary battery electrode separator assembly is characterized in that the separator is provided by a seam-free sintered porous polymer envelope enclosing the electrode, the envelope being closed at the bottom edge of the electrode and provided with venting means adjacent the top edge of the electrode for gas escape therefrom. The gas venting should be sufficient to ensure that gas does not accumulate detrimentally within the separator envelope (for example during charging) and can be readily achieved by having the top edge of the envelope open or perforated. Any alternative arrangement providing adequate venting could equally well be used.

The envelope preferably surrounds the positive electrode and has the spacing from the positive electrode arranged in the form of integral channels or passages located in the interior surface of the envelope, or that area of the interior surface of the envelope which will be opposite the pasted area of the plate; or the envelope is spaced outwardly from the pasted area to provide a single such passage or space. When the sheath or envelope surrounds the negative electrode the channels are in the exterior of the envelope as well as, or instead of, additional channels on the interior of the envelope.

The dimensions and number of the channels or passages which provide venting for the gases mentioned above are tailored to suit the polarity of the plate with which they will be used. Thus, for one form in which the envelopes surround the positive electrodes which are 11.5 cms by 11.5 cms, nine vertical passages may be provided in the interior face of each envelope on each side of the plate, each passage being about 1 mm deep and separated from each other by ribs about 1 mm wide each passage thus being about 1 cm wide; and the envelope has a tight fitting closed margin at least at the bottom of the plate e.g. 0.3 to 1.5 cms wide. The envelope is about 5 mm thick overall and has narrow vertical external channels corresponding to the internal ribs each about 1 mm wide and 0.5 mm deep. In another form of a positive electrode of the same general dimensions the passages extend down to the bottom bar and thus the bottom margin is considerably narrower, for example 0.2 mm to 0.4 mm. In addition, a passage may be formed around one or each side bar to allow for grid growth during service in a battery. In some forms of battery, if the positive plates were sheathed in such an envelope, the negative plates would require no sheathing and the narrow external channels in the envelope would provide adequate gas venting for the negative plates. These channels also facilitate access of acid to the positive plate.

In an alternative assembly the envelopes surround the negative electrodes which are 11.5 cms by 11.5 cms and the gas passages may consist of nine or ten vertical passages provided in the interior face of the envelope on each side of the plate, each passage being at least 0.1 mm, 0.2 or 0.5 up to 1.0, 1.5 or 2 mm in maximum transverse dimension and may be of round or square or other cross section.

For both electrodes the gas passages may open out individually through the top edge of the envelope or sheath or the top edge may be open for its full length or part of its full length to provide adequate venting.

For envelopes for positive electrodes the gas passages preferably overlie at least 40 percent or 50 percent of the total pasted area of the plate and preferably at least 70 percent, 80 percent or 90 percent or more of the total pasted area. If a single passage is used it may overlie the entire pasted area.

The pasted area of the electrode is that area which is enclosed within the top and bottom and side bars of the electrode grid.

In the positive electrode described above, the pasted area is 10.9 cms by 10.9 cms i.e. 118.8 sq. cms. The area overlain by the gas passages is 10.5 cms by 10.2 cms, i.e., 107.1 sq. cms less the area occupied by the spaces between the passages which provide internal ribs separating the gas passages and bearing against the pasted area. The area of these ribs is 10.2 × 0.15 cms i.e. 15.3 sq. cms. Thus the gas passages overlie about 77 percent of pasted area.

The internal ribs for the positive electrode may be anything between 1 mm or less and 3 mm or more wide and preferably are wider at the bottom than at the top so as to facilitate removal of the prongs (conveniently used to form the passages and described in more detail below) which may themselves taper being thicker at the top than at the bottom. Indeed there is no need for the gas passage to be the same depth or width for the whole of their length and they could be tapered or varied in thickness in both or either dimensions, preferably broadening towards the top, as desired.

The negative electrode as mentioned above does not have to accomodate as substantial gas evolutions as does the positive electrode nor is such a high degree of access of electrolyte required.

Thus, when the negatives are to have separator envelopes and the positive electrodes are to be left bare, it is preferred that the separator envelopes have a porosity of at least 45 percent and a pore size in the range 1 to 50, for example about 5 to 30 microns, and afford means for spacing the external surface of the negative electrode separator at least 0.1 mm away from the surface of at least 20 percent of the pasted area of the positive electrode, so as to provide adequate means for gas venting from and electrolyte access to the positive electrode.

Thus, the gas passages for the negative can be dispensed with provided the external configuration of the sheathed negative is compatible with the requirements of the positive electrode both as to gas venting and electrolyte access.

Thus, in a material having a porosity in the range 45 to 55 percent and a pore size of the order of 20 to 30 microns, it is found that adequate provision exists for gas venting from a negative plate at least under normal conditions of use and no additional internal gas venting channels have to be provided.

However, in this case, external ribs are provided either by a two stage sintering operation or by other conventional means of applying a polymer composition. Indeed these ribs which only need to be quite narrow so as merely to fulfil the function of the ribs described for the positive electrode above, need not be microporous, i.e., they could be solid and could be applied or formed in situ as desired. Indeed other external surface configurations providing gas channels for the positive electrode for example stippling of the surface are quite satifactory. Thus, all that is required is some convenient means for spacing the external surface of the negative electrode envelope from the pasted surface of the positive electrode such as to allow adequate electrolyte access to and gas venting from the positive electrode.

Most conveniently, however, the means for spacing the negative envelope from the positive are afforded by protuberances or corrugations enveloping narrow gas passages e.g., 0.1 mm to 1 mm in maximum transverse dimensions on the internal surface of the negative separator envelope.

While these protuberances or corrugations are not essential to the negative plates operation they can very easily be formed as part of the preferred process for making the separator envelope which is described in more detail below.

In the stippled electrode described below, the compacted area of the envelope overlies some 30 percent of the pasted area of the electrode and, thus, would be spaced from the surface of the pasted area of a positive electrode held against such a sheathed negative electrode by the discrete separate raised stipples. The compacted area thus provides a single intercommunicating gas passage way from bottom to top of the electrode being at its narrowest points about 1 mm wide and at its greatest thickness about 0.4 mm thick.

If desired external ribs may also be provided for example a plastisol polyvinyl chloride composition could be formed on the outside of the finished sheath as by extrusion thereon followed by appropriate evaporation of solvent or diluent and gelling of the composition as by heating. Other conventional techniques for forming microporous polymer bodies such as coagulation from a solution by non solvent could also be used. Alternatively, non porous ribs could be formed or preformed porous or non porous ribs or other spacers attached to the outside of the envelope as by welding or glueing.

It will be appreciated from the above description of the individual novel electrode structures that they can be used both with each other and with unsheathed electrodes in many combinations to produce simplified electric storage batteries with simplified assembly operations.

Some of the preferred combinations are as follows:

A secondary electric battery having positive electrodes enclosed in seam free electrolyte permeable envelopes with internal gas passageways with or without open top edges provided adequate venting is provided, in combination with bar electrode negatives. The grooves in the outer surface of the positive sheath (as produced by the gaps between the prongs of the yoke desirably used in the production of the envelope or sheath) provide sufficient gas venting and electrolyte access for the negative.

A secondary electric battery having negative electrodes enclosed in seam free electrolyte permeable envelopes having open or vented top edges and affording external spacer means e.g., ribs or corrugations providing a spacing, for example of 0.1 0.2 to 1 mm or more from the positive, in combination with bare positive electrodes.

A sheathed negative having internal gas passageways (and thus external ribs) having an open or vented top might be used with a bare or unsheathed positive electrode.

A sheathed negative having an open or vented top and having a stippled outer surface, thus providing gas venting and electrolyte access for the positive, might be used with a bare positive electrode.

The invention also extends to assemblies of at least one positive electrode and at least one negative electrode, one of which is provided with a seam free sintered envelope of dielectric material, and also to electric storage batteries incorporating such assemblies.

Thus, according to another aspect of the present invention, a lead acid electric storage battery assembly comprises at least one electrode of each polarity at least one of each such pair of electrodes being enclosed within a seam free unitary electrolyte permeable separator envelope closed at the bottom edge of the electrode while affording means for spacing the said envelope, preferably at least 0.1 mm and desirably at least 0.3, 0.5 or 1 or more mm away from the surface of, preferably at least 40 percent and desirably at least 50 percent or 70 percent or more, of the pasted area of the positive electrode, so as to provide adequate means for electrolyte access to the positive electrode and gas venting, the said envelope having at least one opening at or adjacent the top edge of the electrode extending along at least 40 percent of the width of the electrode.

The envelope supports the active material in the grid and thus low antimony grids can be used. It is thus preferred that the alloy of the electrode grid contains not more than 6 percent of antimony and especially only 4 percent or less.

The invention also extends to an improved process for making the envelopes. Thus, according to this aspect of the invention, a process for making a unitary separator envelope for a battery electrode is characterized in that former means having an external surface corresponding to the desired internal surface of the envelope are heated to elevated temperature and are contacted with discrete dry polymer particles whereby a cohesive porous coating of the polymer of the desired thickness is formed over the former means and the coated former means are then reheated to sinter the coating to a tough porous sheath.

The former having a heated external surface corresponding to the desired internal surface of the envelope may correspond closely or exactly to the external surface of the electrode or may have broad vertical ribs so as to provide one or more gas passages on the inside face of the envelope. The heat provided to the former means needs to be sufficient to render the coating cohesive and self supporting but it need not have any very great structural strength at this stage. Thus the subsequent heating stage is used to bring the structural strength of the porous coating up to the desired final level and this could be combined with consolidation as by calendering the coating on the former. The subsequent heating stage is preferably carried out while the cohesive layer is on the former but if the layer is already self-supporting and its strength merely needs increasing the heating could be done off the former.

Preferably the process comprises providing the former means with removable masking means, forming a unitary porous separator envelope enclosing the former means and masking means, and withdrawing the masking means through the top edge of the envelope and is characterized in that the masking means are at least 0.1 mm thick and overlie at least 40 percent and preferably substantially the whole of the pasted area of the electrode, but do not overlie the bottom bar of the former means so that the envelope is closed at the bottom edge.

The former may be the electrode with which the envelope is intended to be used or may be the electrode provided with gas passage forming means arranged on either side of it. If a negative electrode is being sheathed and no masking means are used, at least one opening (preferably the whole top edge) is formed in the top edge of the porous sheath to provide adequate gas venting. The gas passage forming means may comprise yoke means affording prongs adapted to extend from the top edge of the plate to the vicinity of its bottom edge, and once the coating is in self supporting form the prongs may be withdrawn through the top of the coating.

In order to form the first form of the envelope quoted above each yoke would have nine parallel prongs extending from a top cross member, and each prong would be about 10 cms long 1 cm wide and 1 mm thick. After the final heating step the top of the envelope above the prongs is cut away and the prongs withdrawn.

In order to form the second form of the envelope for a positive electrode quoted above, the prongs of the yoke would be longer, e.g. about 11 or 11.2 cms long. Additional prongs are provided at each end of the yoke and are formed so as to wrap closely round the side bars of the electrode.

In a further alternative a metal or other heat conducting body is used instead of the electrode. It has the same external dimensions as the electrode with which the envelope is to be used and when the prong arrangement mentioned above is used can easily be withdrawn from the envelope after the prongs are withdrawn. If a prong arrangement is not being used the former could be collapsible or in two or more parts for example in three vertical sheets. The inner sheet could be removed first and then the outer sheets could be displaced inwardly and then removed.

Experiments have indicated that a modification of this later arrangement in which the inner metal sheet is the electrode itself is preferable to the yoke arrangements since the yokes are liable to become distorted by the heating while metal sheets are less liable to distortion.

In this form of the invention the process is characterized in that the masking means are of thin sheet metal with wide ribs at least 0.1 mm thick, the said ribs overlying at least 40 percent of the pasted area. The masking means are located on the electrode or former with the ribs facing outwardly so that on forming the porous coating and removing the masking means the resultant sheath has wide gas passages corresponding to the wide ribs spaced at least 0.1 mm from the surface of at least 40 percent of the pasted area and venting through the top edge of the sheath. Preferably the masking means also extend around and mask the side bars of the electrode so as to allow for grid growth. In this arrangement the metal sheets extend across the full width of the electrode (and preferably slightly wider to provide an edge passage to allow for grid growth in use) and from just above the bottom bar to about 3 to 5 mms above the top bar. They are about 0.2 to 0.5 mms thick with, for the positive electrode, outward facing ribs which may be tapered in width or thickness or both from top to bottom like the yokes described above, and these ribs can have the same dimensions and be provided in the same numbers as were described for the yokes e.g. about 0.5 to 1 mm thick and about 1 cm wide for a plate 11.5 by 11.5 cms and about 1 mm apart. The metal sheets can be considered as the yokes attached to a thin base plate. The extra spacing of the envelope from the electrode surface produced by the base plate disappears on assembly in the battery.

For the negative electrode narrow ribs e.g., 1 cm wide and 1 mm thick about 1 mm apart could be used essentially to form external ribs or corrugations for spacing the exterior of the envelope from the positive plate.

The withdrawal of the prong arrangement and that of the metal sheets just referred to may be facilitated especially for large electrodes and non tapering gas passage forming means by applying non stick surfaces to the formers e.g., chromium plating or polytetrafluoroethylene coating metal formers by conventional techniques such as those used for frying pans.

The formers used need not be of metal but these have good strength, heat capacity and durability, especially heat resistance.

The sheet formers have a further advantage over the yoke or prong formers in that in assembly with an electrode the sheet formers produce a more even coating especially in thickness due it is thought to the more even heat capacity of the assembly.

In a further alternative form of the invention the gas passage forming means are partially permanent and partially removable. A chemically inert openly porous sheet or mat e.g. of glass fibre material, e.g. 0.1 to 1 mm thick having a low density e.g. less than 0.5 grams/per cc e.g. 0.01 to 0.1 grams/per cc is placed on each side of the electrode, for example draped as a single sheet over the top bar of the electrode around the lug enclosing the edges of the plate to just above the bottom bar and then held in place by the yoke or preferably the metal sheet arrangements described above. The metal sheets would not necessarily need ribs (except if the electrode was the negative when external ribs would be needed on the separation sheath) since the glass fibre matt would constitute the spacer. The envelope would again be securely located on the bottom bar and envelope the whole electrode. The glass fibre matt would also produce a gas passage along the top of the plate so that only quite a small vent e.g., 1 cm or so long need be left in the top edge of the plate and the rest of the edge could be sealed.

The electrode is heated in a manner such as not to damage it (for example if the particular electrode is liable to oxidise readily e.g., a formed negative lead acid electrode then the heating can be done in an inert atmosphere or the negative electrode may be enveloped before being formed). The polymer particles preferably have an average particle diameter as measured by optical sedimentation, techniques or by microscopy in the range 1 to 100 microns, i.e., at least 50 percent of the particles will have their maximum dimension in this range. Preferably the polymer has substantially no particles in excess of 50 mesh British Standard, i.e., 150 microns maximum dimension and substantially no particles smaller than 0.1 micron.

In the subsequent heating stage mentioned above the coated electrode may be heated further to a second temperature which may be the same or different to, e.g., higher than the first temperature to ensure that the layer is cohesive whilst remaining porous, i.e., to ensure that substantially all the polymer particles are sintered to their neighbours.

According to a preferred form of the invention a process for making a unitary separator envelope on a battery electrode comprises providing an electrode with gas passage forming means arranged on either side of the electrode at a temperature such that, when its surface is contacted with dry polymer particles, these will adhere as a continuous porous coating and supply the said particles to the said surface, and then heating the coated assembly to form a tough porous coating and removing the gas passage forming means so that one or more gas passages in contact with each electrode surface are formed, and these passages extend to and vent through the upper edge of the envelope. When the discrete dry polymer particles are polyvinyl chloride particles having a particle size such that all particles pass a 50 mesh British Standard screen, the electrode and masking means are preferably heated to a temperature of at least 220°C preferably to 240°C but below the temperature at which the electrode grid starts to melt, and are immersed in a fluidized bed of the cold polyvinyl chloride particles preferably for 1 or 5 to 20 especially 10 to 20 seconds and the resultant even thickness cohesive porous coating is sintered to a tough porous sheath by reheating the assembly, preferably to 240°C. Preferably not more than 15 percent by weight of the polymer particles are in excess of 50 microns in diameter, not more than 25 percent by weight are below 5 microns diameter and the remainder are between 10 and 50 microns in diameter. However smaller particle sizes could be used i.e., more than 25 percent could be below 5 microns.

When the electrode is a lead acid positive electrode and the masking means are preferably such as to produce internal gas passages overlying at least 70 percent of the pasted area of the electrode and the gas passages are 0.3 to 1 mm thick.

The coating may also be subjected to pressure to achieve overall or preferably discrete consolidation of localised areas for example while still above room temperature for example to emboss a surface pattern as of strippling or ribs on the surface of the coating.

The polymer composition is dry, that is to say it comprises solvent and liquid free polymer particles with non molten surfaces. The coating may be achieved by dipping the heated electrode into a batch of the power composition preferably in a fluidized state as by air or gas fluidization.

Any other coating techniques which result in initially discrete polymer particles being deposited on the surface of the heated electrode can be used instead of dipping.

The technique so far has been satisfactorily used with unformed positive and negative electrodes for lead acid batteries. However it is not believed to be limited to its usefulness to these particular types of electrodes.

It will be appreciated that the envelope when made by the preferred process is a unitary structure with the envelope sheath or coating being formed in situ on the electrode.

This results in a very close fit of the envelope to the detailed surface shape of the electrode. Thus in the areas where the envelope or coating is in contact with the surface of the electrode the minute surface modifications of the electrode are very closely reflected in the interior surface of the coating. However, the coating essentially does not penetrate the active material. By this is meant that the coating can be lifted away from the electrodes and only very little active material (and certainly not a continuous layer) will be found to be adhering to the coating. The porosity of the electrode is thus essentially unaffected by the formation of the separator on it.

The coating is preferably of a polymeric plastics material which has a sufficient degree of flexibility not to be damaged by the physical changes (of expansion and contraction) which occur during charge and discharge. Any such polymer which can be brought into a finely divided state, e.g., all particles passing through a 50 mesh and preferably a 100 mesh British Standard screen, can be used, provided it is also one which when in a finely divided form can be caused to sinter into a cohesive porous structure at a temperature below the melting point of the electrode. The polymer should also have adequate resistance or be capable of being formulated so as to have adequate resistance to the chemical conditions in the battery (for example the oxidative conditions adjacent the positive electrode in certain states) and be insoluble in the electrolyte. It should also be a dielectric or insulating material.

Provided these conditions are fulfilled, a wide range of polymers can be used and they may be thermoplastic or thermosetting. Examples include polyvinyl resins, e.g., polyvinyl chloride, polyolefin resins, e.g., polyethylene, polypropylene, aromatic resins, e.g., polystyrene, phenolic or phenol formaldehyde resins, e.g., novolak phenolic resins, and epoxy resins, e.g. B-stage cured epoxy resins. The polymer compositions can include fillers, stabilizers and other additives and a reference to polymer herein includes such compositions.

The envelope preferably comprises a porous material having an average pore size as defined herein not in excess of 100 microns. However, there may be a number of areas in the structure where there are voids having dimensions well in excess of 100 microns. In order to provide adequate permeability it is preferred that the pore size of the envelope should be in excess of 1 micron. The most preferred ranges are 5 to 50, e.g., 20 to 30 microns. The structure could also be post treated in accordance with British Pat. No. 1258404 the disclosure of which is incorporated herein by reference to achieve any desired reduction in pore size by precipitating siliceous material in the pores of the coating.

The term pore size or pore diameter used herein in connection with the unitary coatings envelopes or sheaths in accordance with the present invention is the value obtained by the following experimental method. Pore size in this sense is not the maximum dimension of the voids in the material but reflects the dimensions of the holes in the walls surrounding or defining the voids, which holes provide intercommunication between the voids.

The pressure required to force mercury into a pore is directly proportional to the pore diameter. The volume of mercury forced into the pore is equal to the pore volume. The porosity of a sample is plotted against the pore size by observation of the volume of mercury forced into the sample at set pressures.

First, the apparent volume of the sample is determined by geometry. The true volume of solid in the sample is determined by evacuation of the sample followed by introduction of helium to atmospheric pressure and the volume so introduced is measured. The difference between the apparent and true volume gives the total void volume (X). This is composed of pores and larger voids entered by such pores covering the full range of pore diameters each of which requires mercury at definite pressures to fill it. By pre-setting the mercury pressures (P) the volume (V) of mercury forced in is determined and hence the ratio at that pressure of $$V_P/x$$

is determined. This is the porosity at that pore size. By altering the mercury pressure the porosity can be plotted as a function of pore diameter. This will level off at some value which is the total porosity of the sample, i.e., all pores are filled with mercury. 0.03 microns is considered as the lowest diameter. The value so obtained is in very close agreement to other methods but has the advantages of showing the range of pore diameters. The point of inflection in the curve is taken as the average pore diameter.

The coating preferably has a thickness in excess of 0.2 mm for example in excess of 0.5 mm and may be as thick as 1.5 mm though the range 0.7 to 1.2 mm is found particularly suitable.

The coating preferably has a porosity as above defined in excess of 30 percent, for example in excess of 60 percent or even up to 80 percent but the range 45 to 55 percent is found particularly suitable.

The strain free nature of the material is an advantage in that, under severe operating conditions, for example when temperature rises occur as during high discharge rates or during initial activation of a dry charged battery, the coating is not so liable to shrink and, thus, rupture as might be the case with coatings which have been formed in such a way as to lock in strains which can be released on rises in temperature to cause shrinkage of the coating.

Figure 2:
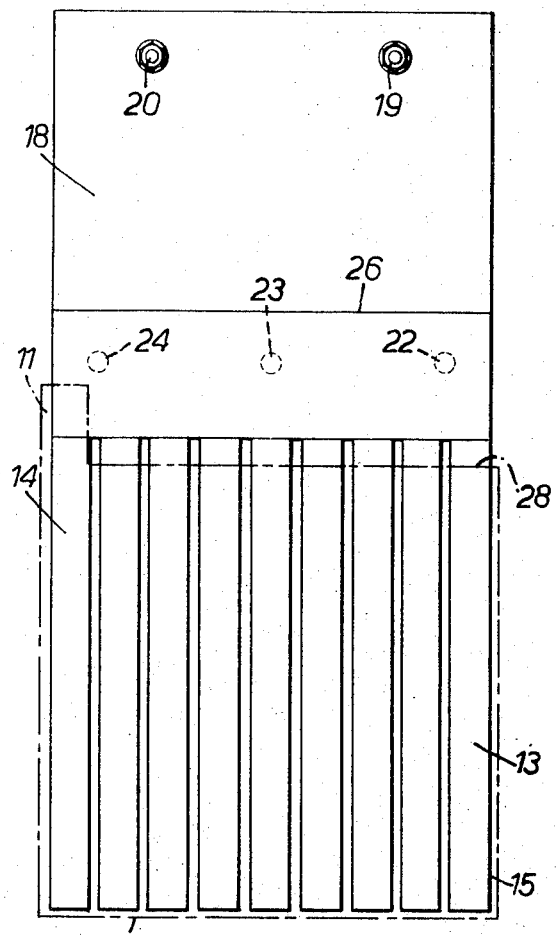
Figure 3:
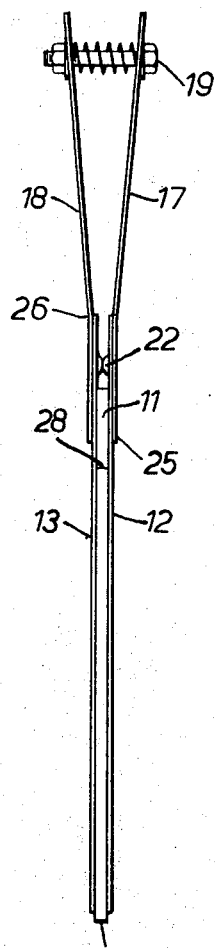
Figure 4:
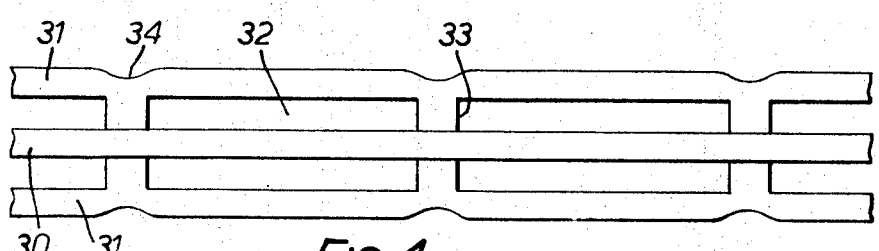
Figure 5:
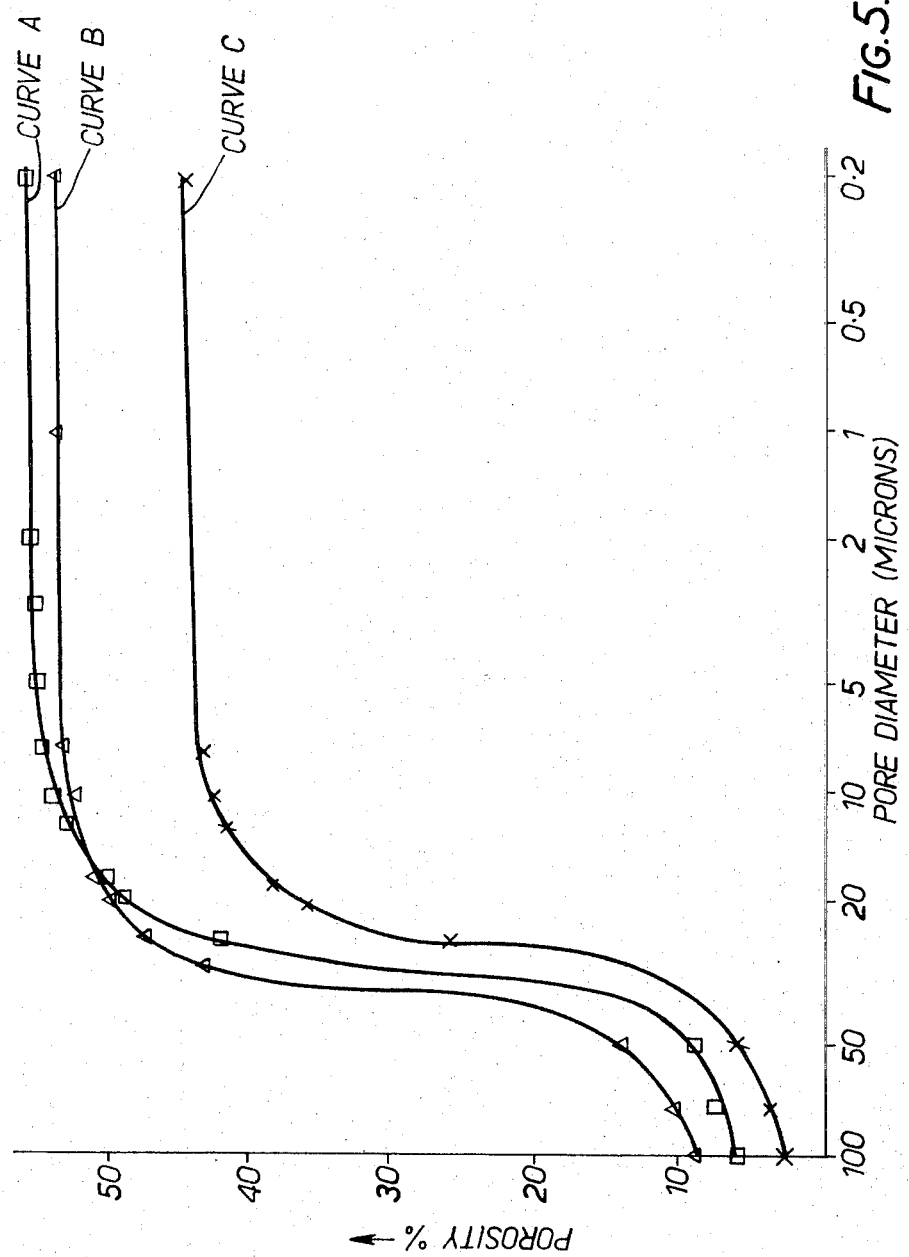
Figure 6:
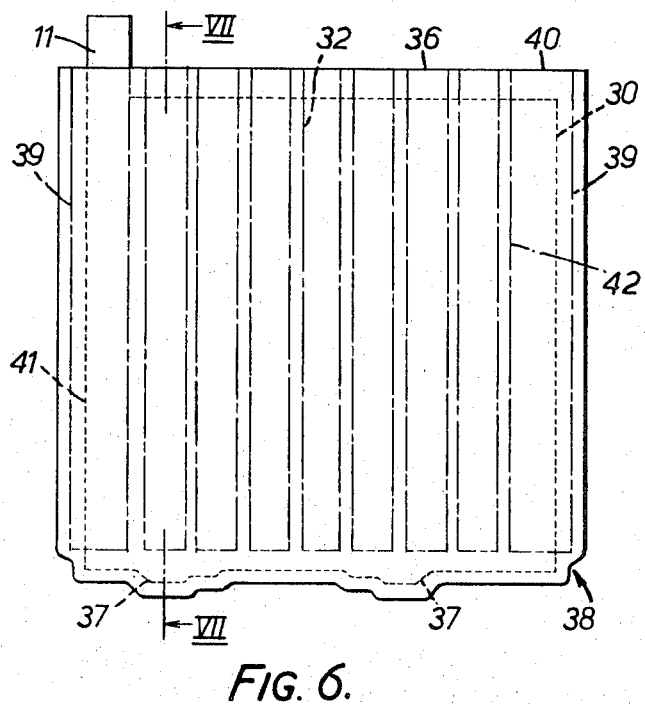
Figure 7:
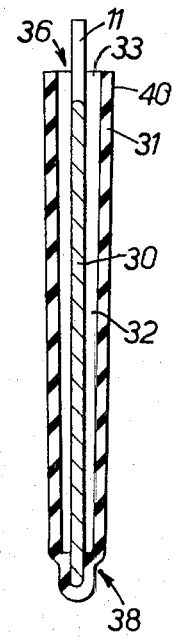

The invention can be put into practice in various ways and certain embodiments of sheathed electrode separator structures and processes for making them in accordance with the invention will be described by way of example with reference to the accompanying drawings in which FIG. 1 is a graph plotting pore size as measured by a mercury porosimeter against cumulative pore volume for the product of Example 1, FIG. 2 is a diagrammatic side elevation of the arrangement described in Example 22 below, FIG. 3 is an end elevation of the same arrangement as FIG. 2, FIG. 4 is a diagrammatic cross-sectional view on an enlarged scale of part of the product of Example 22, FIG. 5 is a graph similar to FIG. 1 for the product of Example 22, curve A; that of Examples 14 and 19 curve B; and a standard ribbed sintered polyvinyl chloride separator, curve C, FIG. 6 is a diagrammatic side elevation similar to and on the same scale as FIG. 2 showing a sheathed positive electrode made as described in Example 28, the dotted lines show the extremity of the electrode and the chain lines show the gas passages 32, and FIG. 7 is a cross-section on the line VII—VII in FIG. 6.

EXAMPLE 1

A conventional lead alloy grid for a negative electrode of a lead acid battery being 1.8 mm thick and 11.5 cms wide by 11.5 cms high and having a single terminal lug at one top corner and two bottom spacer lugs and made of an alloy melting at 252° – 288°C having a 4 percent antimony 0.4 percent arsenic 0.2 percent tin composition, is pasted with a conventional active material. The dry pasted plate weighs 140 grams.

The plate is heated for 7 minutes in a recirculating air oven maintained at a temperature of 240°C so that it attains a temperature of 235°–240°C as measured by a surface thermocouple. The heated plate is then dipped into a bed of polyvinyl chloride powder.

The fluidized bed was a sintered glass Buchner funnel 17.5 cms in diameter and 27 cms deep. The maximum pore size of the sintered glass base plate was 5 to 10 microns. The stem of the funnel was connected to a flow meter and a nitrogen cylinder. The polyvinyl chloride powder used was the same as in Example 1 and a flow rate of 2 litres of nitrogen per minute caused satisfactory fluidization, the volume increase of the bed being about ⅓, no blow holes being visible in the top surface of the bed and the bed having a viscosity similar to that of a liquid and offering no resistance to the insertion of objects. The pore size of the glass plate was determined by the method described in British Standard specification No. 1752/1963.

This method involves measuring the air pressure P required to force the first air bubble through a sheet of the material when completely saturated with n-propanol and determining the pore size d, from the equation: -

$$d = 30\ \gamma/P$$

where $\gamma$ is the surface tension of n-propanol in dyn./cm at the temperature of the test and P is in mmHg.

The fine porous sheet can be of any suitable material, for example glass, ceramic, metal or polymeric plastic material.

The fineness of the pore size of the sheet and the rate of flow should be adjusted to keep the air or gas bubbles as fine and uniform as possible and the bed in as compact a state as possible consistent with it being in a finely fluidized condition. Thus, low air flows are desirably combined with fine porosity in the sheet. A typical polyvinyl chloride powder which is suitable is one such that 100 percent by weight passes a 100 mesh sieve, i.e., is less than 152 microns in diameter and 92 percent by weight passes a 300 mesh sieve (British Standard mesh), i.e., is less than 53 microns in diameter 8.4 percent has a particle size between 152 and 53 microns, 38 percent has a particle size between 53 and 30 microns, 26.8 percent has a particle size between 30 and 11 microns, 5.6 percent has a particle size between 11 and 5.5 microns and the remainder 21.2 percent has a particle size less than 5.5 microns.

Using this powder with the above fine porous sheet in a bed 27 cms deep and of 240 sq. cms. area a total air flow of 0.002 cubic metres per minute produces satisfactory fluidization.

The heated pasted grid plate at an initial temperature of 235°C was dipped for 20 seconds in the fluidized bed of polyvinyl chloride powder and, on withdrawal, was completely covered with an even layer of the powder about 1 mm thick. The coated plate was then immediately returned to the air oven at 240°C for 3.5 minutes after which time the powder layer had attained a surface temperature of 200°C, as measured by a surface thermocouple, and its thickness was about 0.75 mms. While still hot the coated plate was passed through cold (20°C) contoured rollers to produce a stippled finish. The height of the stipples being about 0.4 mms, the thickness at a stipple being about 1.2 mm and between stipples about 0.8 mm and each stipple being 4 mm in diameter and spaced from adjacent stipples by 0.8 mms.

FIG. 1 is a typical distribution curve for this embossed separator envelope. It has a total volume porosity or void volume of 42 percent and an average pore diameter of 20 microns. The material has an apparent density of 0.77 g/ml. and a true density of 1.41 g/ml. If desired, a more porous product could be made by making the material more porous before the stippling operations, e.g., by lowering the sintering temperature or increasing the polymer particle size or both.

Alternatively, the rollers could be such as to produce ribs which could be vertical or angled to the plate as desired and of conventional dimensions.

The finished product is a pasted plate completely enclosed within an electrically insulated envelope or coating of microporous polyvinyl chloride.

The inside face of the coating was substantially smooth over the whole area, while conforming closely in dimensions and configuration to the electrode. The area under the raised stipples was essentially free of active material and comprised about 65 percent of the total area. The area between the stipples, i.e., where consolidation has occured, carried a very thin layer of active material and only around the edge of the plate did it have any discernible continuity. Elsewhere, it was little more than a staining or discolouration of the surface.

The figures for physical properties quoted above are very similar to those obtained when a conventional sintered separator is made from the same powder as that described above. The invention thus provides a novel structure having similar properties to the known combination of plate and separately formed separator but very considerably facilitates assembly of batteries by avoiding the need to align the plates and separators and avoids the need for handling the somewhat brittle separately formed separators. The microporous polyvinyl chloride layer in the present invention also reduces troubles due to breakdown of the paste during service in the battery since, unlike conventional batteries with individual separators, pieces of active material which have lost their attachment to the grid are held for being displaced by the polyvinyl chloride envelope and this source of short circuits is avoided.

EXAMPLES 2 – 21

Conventional unformed negative plates in a dry state were suspended from their lugs and heated in an air oven under varying conditions as shown in table 1 below, and were dipped in the same fluidized bed as used in Example 1 for varying periods of time as shown in Table 1. The coated electrodes were then heated in an air oven at 240°C for 3½ minutes. Table 1 gives the weight of powder picked up by the electrodes under the varying conditions of preheating and dipping.

Table 1

| Example | Preheat time minutes | Preheat oven temperature °C | dip time seconds | weight powder picks up grams |
|---|---|---|---|---|
| 2 | 7 | 190 | 20 | 6.0 |
| 3 | 7 | 200 | 20 | 7.0 |

Table 1-Continued

| Example | Preheat time minutes | Preheat oven temperature °C | dip time seconds | weight powder picks up grams |
|---|---|---|---|---|
| 4 | 7 | 210 | 20 | 8.0 |
| 5 | 7 | 220 | 20 | 10.6 |
| 6 | 7 | 225 | 20 | 11.3 |
| 7 | 7 | 232 | 20 | 11.7 |
| 8 | 7 | 240 | 20 | 12.4 |
| 9 | 1 | 240 | 20 | 5.2 |
| 10 | 2 | 240 | 20 | 8.9 |
| 11 | 3 | 240 | 20 | 11.0 |
| 12 | 4 | 240 | 20 | 12.2 |
| 13 | 6 | 240 | 20 | 12.5 |
| 14 | 7 | 240 | 20 | 12.5 |
| 15 | 12 | 240 | 20 | 12.5 |
| 16 | 7 | 240 | 5 | 7.7 |
| 17 | 7 | 240 | 10 | 9.8 |
| 18 | 7 | 240 | 15 | 11.0 |
| 19 | 7 | 240 | 20 | 12.5 |
| 20 | 7 | 240 | 25 | 14.0 |
| 21 | 7 | 240 | 30 | 16.0 |

Examples 2 to 8 and 16 to 21 when plotted on graphs show straight line relationships. Examples 9 to 15 when plotted as a graph show the weight pick up levelling off to a constant value after 6 minutes of preheating: presumably indicating that with the oven used it took 6 minutes for the plate to be heated right through to 240°C.

Examples 20 and 21 had thick patches of powder indicating that at dip times over 20 seconds the pick up of powder tends to start becoming uneven.

EXAMPLE 22

In this example a plate as described in Example 1, but pasted with conventional positive active material, is dipped between two spring loaded flat sheet slitted combs 0.77 mm thick. Referring to FIGS. 2 and 3 the battery electrode is 10, the plate lug is 11. The combs 12 and 13 have nine prongs each 10.1 mm wide at the top by the battery lug in the region 14 where they are spaced 1.55 mms apart. At their lower ends 15 the prongs are 9 mm wide and are spaced 2.3 mm apart. The total prong assembly is 10.6 cms wide and 11.2 cms long. The prongs are supported on metal plates 17 and 18 diverging outwardly at their free ends and biased outwardly by two bolts 19 and 20 acting around three pivot bolts 22, 23 and 24 so as to force the ends 15 of the two sets of prongs towards each other. The distance from the top edge 25 of the prongs to the point 26 at which the plates 17 and 18 diverge outwardly is 2.7 cms and the distance from the point 26 to the ends of these plates is 6.1 cms.

The prongs are provided with a non stick polytetrafluoro ethylene coating.

The prongs are clipped around the plate so that the plate can be supported merely by the prong arrangement. The prongs are located on the plate so that a margin of uncovered plate about 2 mms wide is left all round the prongs and the tops 25 of the prongs are about 5 mms above the top edge 28 of the plate.

The assembly of prongs and plate were then heated as in the previous Examples at 240°C for 7 minutes and then dipped in the same fluidized bed as Example 2 for 5 seconds. The assembly was then heated again at 240°C for 3½ minutes, then cooled and the prongs withdrawn through the top edge of the sheathed electrode. The weight of powder picked up was 13 grams showing the advantage of the extra heat capacity provided by the combs. The corresponding Example 16 only resulted in 7.7 grams being picked up. This is the shortest process time to produce this powder pick up and sheath thickness starting with a cold electrode.

This left an electrode enveloped in a porous polyvinyl chloride envelope having nine vertical internal gas passages about 0.8 mms thick about 1 cm wide and extending from top to bottom of the plate on each side and covering about 75 percent of the total pasted area of the plate and each passage opening out about 5 mms above the top edge of the plate thus venting the plate while the 5 mm extension of the sheath prevents bridging across the tops of the plates.

The cross-section of a part of a typical sheathed plate made in this way is shown diagrammatically in FIG. 4. The plate is 30 and the porous envelope 31, the gas channels 32 are separated by sharp cut rectangular cross section ribs 33 (more sharply cut than is obtainable with conventional sintered separators) which bear against the electrode surface. Opposite each rib 33 in the outside surface of the sheath is a shallow channel 34 about the same width as the rib 33 i.e., 1 mm but much shallower (i.e., about 0.1 or 0.2 mm deep) than the rib which is about 0.8 mms. thick. (The battery plate is about 1.8 mms thick and is not drawn to scale). The sheath itself is about 0.7 mms thick and has a tensile strength of $1.6 \pm 0.2$ MN per metre$^2$ measured on a Houndsfield tensometer using a sample 5.1 cms gauge length and 1.96 cms wide at a rate of elongation of 6.3 percent per minute in accordance with British Standard specification No. 18/1950. The elongation at break on the same test was 2.5 percent.

The porosity of the product was 58 percent measured by a mercury porosimeter and the porosity of Examples 14 and 19 was 54 percent.

The mean pore size of Example 22 was 33 microns and that of Examples 14 and 19 was 37 microns. FIG. 5 gives the pore size distribution for these two groups of products and a conventional sintered ribbed separator.

The electrical resistances of separator material taken from the sheathed negatives of Examples 14 and 19 from the sheathed positives of Example 22 were compared with standard ribbed sintered polyvinyl chloride separators having pore distributions as shown in FIG. 5 total porosity 44 percent and mean pore size 28 microns in a standard test apparatus.

The test apparatus contained 1.270 specific gravity sulphuric acid and the separators were allowed to soak for up to 24 hours, and the resistances of the separators were then measured at varying intervals of time during the 24 hour period and are expressed in table 2 below in milliohms per 50 centimeters$^2$.

The test is carried out using a perspex box about 3 cms long 10 cms deep and 5 cms wide. The inside walls are grooved and hold two porous lead electrodes 10 cms deep by 5 cms wide 3 cms apart.

The sample of separator 10 cms deep by 5 cms wide is placed midway between the electrodes in the box which is filled with electrolyte.

An EIL A.C. milliohmmeter (Model No. 47A), supplied by Electronic Instruments Limited of Richmond Surrey, England, is used on the 120 milliohm range to pass a standard current through the cell between the electrodes and the instrument measures the voltage drop and indicates the resistance directly on a scale. The measurement is done first without the separator in position. The separator is then placed in position and the reading repeated at intervals. The resistance of the separator at a given time is taken as the difference between the cell resistance at that time and the initial cell resistance without the separator.

Table 2.

| Example | Soaking Time | Resistance |
|---|---|---|
| 22 | 2 minutes | 8 |
| 22 | 20 minutes | 6 |
| 22 | 120 minutes | 4 |
| 22 | 24 hours | 3 |
| 14 | 2 minutes | 11 |
| 14 | 20 minutes | 9 |
| 14 | 120 minutes | 8 |
| 14 | 24 hours | 5 |
| Standard sintered separator | 2 minutes | 11 |
| do. | 20 minutes | 10 |
| do. | 120 minutes | 8 |
| do. | 24 hours | 6 |

EXAMPLE 23

Examples 14, and 19 it will be appreciated are made under identical conditions. In this example the product of Example 14 had the closed sheath at its top edge open thus providing a vent for escape of gas generated by negative plate during formation.

EXAMPLE 24

A positive electrode was sheathed as described in Examples 14 and 19.

EXAMPLE 25

The sheathed positive electrode of Example 24 was vented as in Example 23.

Plain sheathed negative plates of Examples 14 (unvented) and 23 (vented) and plain sheathed positive plates of Example 24 (unvented) and 25 (vented) are spaced sheathed positive plates of Example 22 (which are vented) were tank formed in 1.020 specific gravity sulphuric acid at 16.5 amperes per Kilogram of active material, and were compared with standard non sheathed positive and negative plates.

When the single plates of Example 24 were discharged at the 5 minute rate they achieved only 58 percent of the capacity of the unsheathed positive indicating limitation of capacity it is thought by gas locking on formation and acid starvation on discharge. The vented plates of Example 25 were better at 67 percent but still had limited capacity.

When Examples 24 and 25 were repeated using the charged positive plates the values were 53 percent and 68 percent.

The capacity of the negative of Example 14 when discharged at the 5 minute rate was virtually zero due, it is thought, to gas locking during formation, the capacity of the vented negative of Example 23 was 100 percent.

The capacity of the spaced sheathed vented positive of Example 22 was 100 percent at both the 5 minute namely 5.3 amphere hours and 1 hour namely 8.7 amphere hours rate of discharge.

In tank formation the plates are spaced from each other and it is believed that, in unvented sheathed positives, the gas pressure is sufficient to expand or balloon the sheath away from the electrode surface but is insufficient to overcome the surface tension of the electrolyte in the pores of the sheath. A gas pocket thus believed to form inside the sheath and this prevents the electrolyte coming into sufficiently intimate contact with the active material.

EXAMPLE 26

Five single cells were made using bare standard negative plates and ribbed sheathed positive plates made as in Example 22 having a coating weight of 14.5 ± 1.2 grams a web thickness of 0.81 ± 0.08 mms and a rib height of 0.78 ± 0.04 mms and tank formed in 1.020 specific gravity sulphuric acid for 20 hours at 16.5 amperes per Kilogram of positive active material followed by vacuum drying at 80°C for 18 hours.

The cells contained 4 negatives and 3 positives and 415 ml of 1.270 specific gravity sulphuric acid.

EXAMPLE 27

Five single cells were made using bare standard negative plates and ribbed sheathed vented positive plates made as in Example 22.

Each cell contained 4 negatives and 3 positives and 415 ml. of 1.235 specific gravity sulphuric acid in which the plates were jar formed at 3 amperes for 48 hours.

The cells of Examples 26 and 27 were compared with standard single cells using bare negatives and bare positives and sintered ribbed polyvinyl chloride separators charged in the same way as Examples 26 and 27 and the results are given in Table 3 below.

Table 3.

| Example | Capacity in amphere hours under discharge schedule | | | | | | |
|---|---|---|---|---|---|---|---|
| | A | B | C | D | E | F | G |
| 26 | 5.8 ± 0.5 | 9.3 ± 0.2 | 34.5 ± 0.4 | 6.3 ± 0.5 | 35.9 ± 0.3 | 11.6 ± 0.2 | — |
| control | 8.3 ± 0.3 | 11.0 ± 0.1 | 36.0 ± 0.3 | 7.0 ± 0.6 | 36.4 ± 0.2 | 11.2 ± 0.2 | — |
| 27 | — | 10.2 ± 0.3 | 34.5 ± 0.4 | 7.0 ± 0.5 | 32.3 ± 0.2 | 10.7 ± 0.2 | 36.7 ± 0.3 |
| control | — | 9.2 ± 0.2 | 35.4 ± 0.2 | 6.7 ± 0.4 | 33.0 ± 0.3 | 11.0 ± 0.3 | 36.1 ± 0.3 |

Discharge schedule A is the dry charge initial discharge i.e., 20 minutes after adding acid to the cell, the discharge being at 99 amperes to a cell voltage of 1.00 volts at 25°C.

Discharge schedule B is a normal start the discharge being at 99 amperes to a cell voltage of 1.33 volts at 25°C.

C is the 20 hour rate at 1.65 amperes to a cell voltage of 1.70 volts at 25°C.

D is the cold start discharge at −18°C at 99 amperes to a cell voltage at 1.00 volts.

E is the 20 hour rate as in C.

F is a normal start the discharge being at 99 amperes to a cell voltage of 1.33 volts at 25°C. G is the 20 hour rate as in C and E.

The total discharge schedule under which the cells were tested was the individual schedules A to G carried out in alphabetical order with charging to 2.6 volts per cell at 2 amperes for 24 hours between each discharge.

It is believed that the slightly lower capacities of the cells of Example 26 compared with the control are due to incomplete formation of the plates.

The cells of Example 26 still had 20 hour rate capacities of 23.1 amphere hours after 70,196 and 198 cycles of the I.E.C. Normal cycle life test while the controls with sintered separators only lasted 40,54, and 60 cycles before their capacities fell below this level.

The cells of Example 26 had normal start capacities at 40°C of 6.6 and 6.6 amphere hours after 4 units of overcharge of the I.E.C. shallow cycle/overcharge life test, while the controls only had capacities of 3.1 and 4.7.

The cells of Example 27 still had 20 hour rate capacities of 23.1 amphere hours after 90, 95 and 145 cycles of the I.E.C. normal cycle life test while the controls with sintered separators only lasted 35, 56 and 60 cycles before their capacities fell below this level.

The cells of Example 27 had normal start capacities at 40°C of 6.2 and 6.5 amphere hours after 4 units of overcharge of the I.E.C. shallow cycle/overcharge life test, while the controls only had capacities of 3.9 and 4.5.

It will be appreciated that these excellent results have been achieved with 4 antimony grids from which shedding of active material is more likely to occur than with higher antimony alloy grids e.g. 6 percent or 12 percent antimony. These sheaths thus have the added advantage of enabling low antimony e.g., less than 6 percent or possibly even antimony free grid alloys to be used and adequate battery life to be obtained.

EXAMPLE 28

The nine pronged comb arrangement shown in FIGS. 2 and 3 and described in Example 22 is modified as follows. The combs 12 and 13 are replaced by metal plates provided with the same non stick finish. The seven inner combs are reproduced on these plates as if glued to a base plate 0.1 – 0.2 mms thick the two outer combs are made wider and extend out about 2 mms beyond the outside edge of the plate so as to form spaces at the side of the plate to allow for grid growth in use. The metal plates are the same length as the combs and are positioned on the electrode as in Example 22.

The metal plates are conveniently made by milling or cutting out the portions 42 between the combs. These portions desirably have circular bottoms to reduce the area of the rib actually contacting the electrode and facilitate removal of the masks from the formed sheath. However, any desired cross-section could be used for these rib defining spaces.

The same conditions as in Example 22 produce a slightly more even coating since the plates have the same heat capacity over their whole area.

FIGS. 6 and 7 show a sheathed positive electrode made in this way. The electrode 30 is of the same dimensions as that described in Example 22. It has a terminal lug 11 and bottom spacers 37.

The porous polyvinyl chloride separator envelope 31 is a tight fit at the bottom 38 of the electrode. It has 7 vertical gas passages 32 opening out at 36 at the top of the electrode and two vertical edge gas passages 39 extending out beyond the side bars 41 of the electrode 30. The envelope has a flange 40 extending up above the top edge of the electrode by 3 mms, 5 mms or more to minimize bridging or treeing across the top of the electrode.

As in Example 22 and as diagrammatically illustrated in FIG. 7 the gas passages 32 diverge slightly from bottom to top in both width and thickness.

EXAMPLES 29, 30 and 31

These examples compare the effect on capacity of positive plates sheathed in accordance with the invention and provided with varying degrees of venting. Example 31 has the sheath in contact with 100 percent of the electrode surface; Example 30 has 58 percent contact and Example 29 has 25 percent contact.

EXAMPLE 29

The same positive plates were used as in Example 22. Comb or prong shaped yokes as in Example 22 were used for Example 29 producing nine equispaced vertical gas passages 11 cm high by 1 cm wide by 0.5 mm deep. Thus the electrode was vented along its top edge by nine openings each 1 cm. long giving a total vented length of 9 cms or 78 percent of the width of the top edge of the electrode. The electrode surface was actually in contact with the envelope over an area of 33 sq. cms i.e., 25 percent of the aurface area of the electrode.

The electrode was coated by preheating the electrode with the prongs in position as in FIG. 2 for 7 minutes at 240°C. The heated assembly was then dipped for 5 seconds in a fluidized bed of PVC as in Example 22. The cohesive powder coating on the assembly was then heated as in Example 22 at 240°C for 3½ minutes. The sheaths produced weighted about 14 grams and had a web thickness of 0.77 mm.

EXAMPLE 30

Example 29 was repeated except that four of the prongs were removed from each side of the assembly. These were prongs 2, 4, 6 and 8. As a result there were only 5 gas passages, the venting was reduced to 44 percent of the top width and the percentage of the surface area of the electrode in contact with the envelope was increased to 58 percent.

EXAMPLE 31

Example 29 was repeated except that no yokes were used and the dip time was 25 seconds. The venting was zero and the contact 100 percent.

JAR FORMATION TESTS

The sheathed positives of Examples 29, 30 and 31 were then each assembled as three plate cells with two unformed negative plates per cell, located on either side of the positive. The tightness of the assembly was comparable to that normal for production batteries. In the case of plain sheathed plates, Example 31, this effectively prevented the gas generated during formation from expanding the sheath away from the plate. Comparison three plate cells were also made up using bare positives and negatives with the same standard sintered separator sheets as used in Table 2.

All cells were filled in with 1.230 S.G. $H_2SO_4$ and jar formed for 42 hours at 55°C. During the first 24 hours the formation current was 2 amps reducing to 0.75 amps for the last 18 hours. This gave a total formation of 61.5 amphere hours.

After formation some cells of each separator type were dismantled and the sheaths removed from the positive plates. These plates were discharged in 1.270 specific gravity sulphuric acid at 30 amps against two dry charged negative plates spaced 1.25 cm away from the positives. The capacities of these cells to 1.00 volts were recorded.

At this point, the cell voltage is falling rapidly and there is little further capacity available. At the same time, the potentials of the positive plates were recorded with respect to a cadmium reference electrode inserted between the positive and negative plates. This enabled the capacity of the positive plates to be measured independently of any changes in the negatives. Due to the similarity between the potentials of lead and cadmium, a positive plate versus cadmium potential of 1V corresponds fairly closely to a cell voltage of 1V. For this reason the cut-off potential for the positive was defined at 1.00V against the cadmium reference. The capacities of the positives were then calculated from these results.

This test eliminated acid starvation problems on discharge and allowed a direct comparison to be made of the effect of gas locking during formation.

The remaining single cells were discharged as assembled i.e., with their envelopes in position after formation as three-plate cells at 30 amps to 1.00 V per cell and the capacities calculated. The positive plate capacities were determined as before but with the cadmium reference electrode sited across the top of the assembly and dipping into the electrolyte. This test enabled an assessment to be made of the effect of acid starvation on positive plate capacity, although any gas locked in during formation would contribute to the final result.

Table 4 below shows the average capacities of the cells quoted to 1.00V, referred to as ($^c$cell), and the average positive plate capacities quoted to 1.00V with respect to cadmium, referred to as ($^c$cad). In all cases the cell and positive plate capacities were very similar showing that the discharge was limited by the positive plates.

0.2Ah and the positive plate capacity $3.7 \pm 0.1$ Ah.

The need for ribbing was shown by the capacities ($^c$cell) of the three plate jar formed cells (results 5 – 8 in Table 4). The plain sheathed cells with 100 percent contact area (Example 31) only achieved 34 percent of the capacity of the standard sintered separator cells while the ribbed sheathed cells with 25 percent contact area (Example 29) achieved 85 percent. The corresponding figure for ribbed sheathed cells with 58 percent contact area (Example 30) was 81 percent.

The sheathed plates of the present invention provided with venting and internal gas passages have excellent performance and do not suffer from the low capacity observed with unvented structures and structures not having gas passages. In addition the dry process avoids problems of blocking of the porous structure of the active material which is anticipated to occur when molten, fluid or solvent containing systems are used.

The process, moreover, reduces the complications of stock control of separators simplifies battery assembly and increased battery life with low antimony grid alloys as compared with conventional separators.

The invention also extends to a battery either lead acid or alkaline having the electrodes of at least one and preferably both polarities sheathed or enveloped in accordance with the present invention. For certain uses e.g., heavy duty batteries additional separators or spacers e.g., glass wool pads can be used.

The use of cold polymer particles has the considerable advantage of minimizing adhesion to or penetration of the active material by the polymer. it is important that this should be achieved if the electrolyte forming process and the performance of the battery in service are not to be interfered with. Thus penetration of the active material would interfere with the free access of the electrolyte to the active material.

The use of a hot former has the advantage that it enables some control over the thickness of coating to be exercised by variation of the temper the former. Thus Table 4.

| Result | Example | Sheath Present during discharge. | Top venting (%) | Contact area (%) | Average Capacity amphere hours | |
|---|---|---|---|---|---|---|
| | | | | | $C_{cell}$ | $C_{cad}$ |
| 1. | 29 | No | 78 | 25 | 3.9±0.2 | 4.2±0.1 |
| 2. | 30 | No | 44 | 58 | 3.7±0.1 | 3.9±0.1 |
| 3. | 31 | No | 0 | 100 | 3.6±0.1 | 3.7±0.1 |
| 4. | Standard sintered separator | No | — | — | 4.0±0.2 | 4.2±0.2 |
| 5. | 29 | Yes | 78 | 25 | 3.5±0.3 | 3.7±0.4 |
| 6. | 30 | Yes | 44 | 58 | 3.3±0.1 | 3.4±0.1 |
| 7. | 31 | Yes | 0 | 100 | 1.4±0.1 | 1.5±0.2 |
| 8. | Standard sintered separator | Yes | — | — | 4.1±0.1 | 4.9±0.2 |

The need for venting is shown in Table 4 results 1 – 4. The capacity ($^c$cell) of Example 31 is 10 percent less than that of cells made using bare positives and negatives and standard sintered separator sheets.

However $^c$cell for Example 29 is only 2.5 percent less whilst $^c$cell for Example 30 is 7.5 percent less than the comparison cells.

No significant improvement in the capacity of plain sheathed positive plates was obtained by slitting open the sheaths across the top grid member before formation. The cell capacity when this was done was 3.5 ± thicker coatings are formed at high temperatures than are formed at low temperatures.

The use of a metal former instead of the electrode itself is of advantage when the electrode sensitive to the conditions involved, e.g., liable to oxidation for example a negative plate It has been mentioned above that other po can be used.

With polypropylene the electrode could be preheated at 170° C or above and the coated electrode sintered for 5 minutes at 150°C or for 2 minutes at 170°C.

With polyethylene the electrode could be preheated at 150°C or above and the coated electrode post sintered for 5 minutes at 130°C for 2 minute at 150°C.

With B-stage phenolic (P.F.) resin the ele could be preheated to 240°C and the coated electrode post sintered for 7 minutes at 170°C or 2.5 minute at 220°C.

It will be appreciated that in each case longer post sintering times can be used with lower temperatures and shorter post sintering times can be used with higher temperatures.

While the particle size of the polymer is not thought particularly critical it is preferable that at least 30 percent or 40 percent and preferably at least of the particles by weight should have maximum in the range 5 to 150 microns especially 10 to 50 thus desirably not more than 5, 10 or 15 percent are in excess of 50 microns and not more than 15, 20 or 25 percent are below 5 microns. Anything between 30 percent and 80 percent or more of the particles can have maximum dimensions in the range 10 to 50 microns.

What we claim as our invention and desire to secure by Letters Patent is:

1. A process for sheathing a battery electrode in a seam-free separator envelope, comprising the steps of: providing a pasted battery electrode; positioning thereon removable masking means overlying substantially the entire pasted surface of the electrode whereby an external surface corresponding to the desired internal surface of the envelope is provided, the masking means leaving unmasked the bottom edge of the electrode whereby the envelope is closed at its bottom edge, the masking means extending beyond the side bars of the electrode so as to leave a passage at each side of the electrode to allow for grid growth; heating the assembly of the electrode and the masking means to an elevated temperature; immersing said assembly in a fluidized bed of discrete dry polymer particles whereby a cohesive porous coating of the polymer of the desired thickness is formed over the assembly; then reheating the coated assembly to sinter the coating to a tough porous sheath; and withdrawing the masking means through the top edge of the sheath so as to form at least one opening therein.

2. A process as claimed in claim 1 in which the masking means are of thin sheet metal with wide ribs at least 0.1 mms thick, said ribs overlying at least 40% of the pasted area, the masking means being located on the electrode with the ribs facing outwardly so that on forming the porous coating and removing the masking means the resultant sheath has wide gas passages corresponding to the wide ribs spaced at least 0.1 mms from the surface of at least 40% of the pasted area of the electrode.

3. A process as claimed in claim 1 in which the removable masking means are provided with a non-stick surface to which the polymer particles do not adhere even after sintering.

4. A process as claimed in claim 3 in which the non-stick surface is formed of high melting point polymer.

5. A process as claimed in claim 3 in which the non-stick surface is formed of polytetrafluoro ethylene.

6. A process as claimed in claim 1 in which the discrete dry polymer particles are polyvinyl chloride particles having a particle size such that all particles pass a 50 mesh British Standard screen, the assembly of the electrode and the removable masking means being heated to a temperature of at least 220°C but below the temperature at which the electrode grid starts to melt, and being immersed in a fluidized bed of cold polyvinyl chloride particles for 10 to 20 seconds, and the resultant even thickness cohesive porous coating being sintered to a tough porous sheath by reheating the assembly.

7. A process as claimed in claim 1 in which not more than 15 percent by weight of the polymer particles are in excess of 50 microns in diameter, not more than 25 percent by weight are below 5 microns in diameter and the remainder are between 10 and 50 microns in diameter.

8. A process as claimed in claim 2 in which the electrode is a lead acid positive electrode and the masking means are such as to produce internal gas passages overlying at least 70 percent of the pasted area of the electrode and the gas passages are 0.3 to 1 mm thick.

9. A process for sheathing a battery electrode in a seam-free separator envelope, comprising the steps of: providing a pasted battery electrode; covering both sides of the electrode with chemically inert porous fibrous sheet material 0.1 to 1 mm thick having a density of less than 0.5 gms per cc; positioning thereon removable masking means overlying substantially the entire pasted surface of the electrode whereby an external surface corresponding to the desired internal surface of the envelope is provided, the masking means leaving unmasked the bottom edge of the electrode whereby the envelope is closed at its bottom edge; heating the assembly of the electrode and the masking means to elevated temperature; immersing said assembly in a fluidized bed of discrete dry polymer particles whereby a cohesive porous coating of the polymer of the desired thickness is formed over the assembly; then reheating the coated assembly to sinter the coating to a tough porous sheath; and withdrawing the masking means through the top edge of the sheath so as to form at least one opening therein.

10. A process as claimed in claim 9 in which the fibrous sheet material is a single sheet draped over the top bar of the electrode and extending down either side of the electrode to just above the bottom bar of the electrode.

11. A process for sheathing a battery electrode in a seam-free separator envelope, comprising the steps of: providing a pasted battery electrode; positioning thereon removable masking means effective to mask at least 40 percent of the pasted surface of the electrode whereby an external surface corresponding to the desired internal surface of the envelope is provided, the masking means leaving unmasked the bottom edge of the electrode whereby the envelope is closed at its bottom edge, heating the assembly of the electrode and the masking means to elevated temperature; immersing said assembly in a fluidized bed of discrete dry polymer particles whereby a cohesive porous coating of the polymer of the desired thickness is formed over the assembly; then reheating the coated assembly to sinter the coating to a tough porous sheath; and withdrawing the masking means through the top edge of the sheath so as to form at least one opening therein.

* * * * *